No. 647,293. Patented Apr. 10, 1900.
J. F. CREASE.
MANUFACTURE OF TANKS FOR WATER OR OTHER LIQUIDS.
(Application filed May 29, 1896.)
(No Model.) 2 Sheets—Sheet 1.
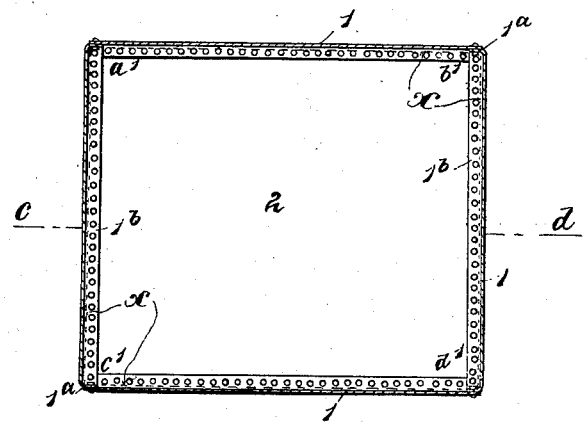
Fig. 1.
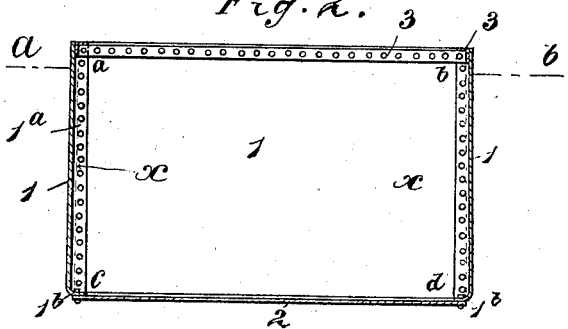
Fig. 2.
Fig. 3. Fig. 4.
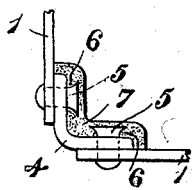
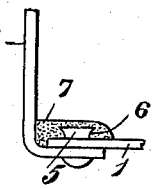
Fig. 5
Witnesses.
C. M. Werle
E. E. Duffy
Inventor:
J. F. Crease
by O. E. Duffy
atty.

No. 647,293. Patented Apr. 10, 1900.
J. F. CREASE.
MANUFACTURE OF TANKS FOR WATER OR OTHER LIQUIDS.
(Application filed May 29, 1896.)
(No Model.) 2 Sheets—Sheet 2.
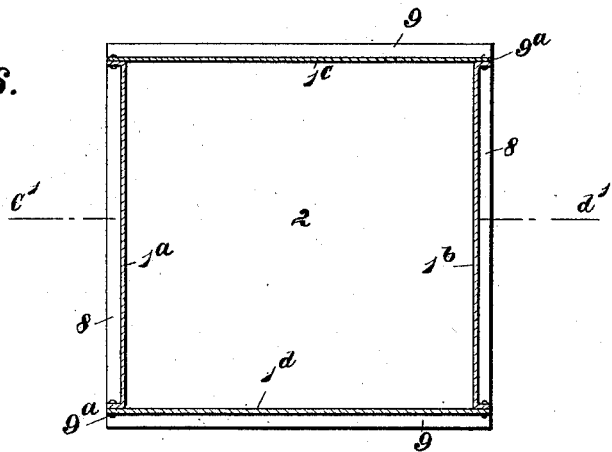
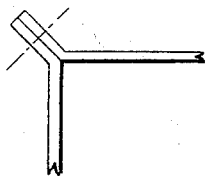 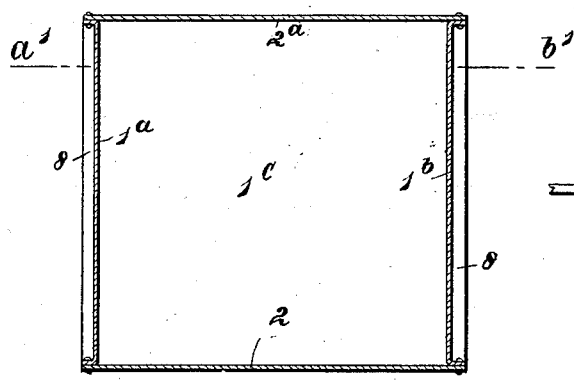 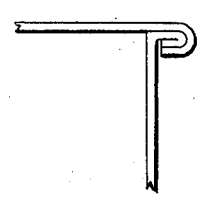
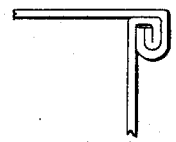 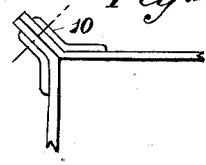 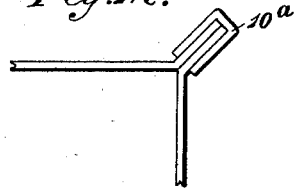
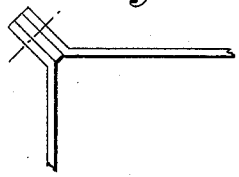 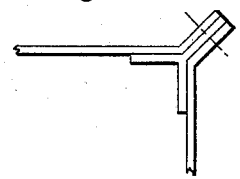
Witnesses.
C. M. Werle
C. C. Duffy
Inventor:
J. F. Crease

UNITED STATES PATENT OFFICE.

JOHN FREDERICK CREASE, OF STOURBRIDGE, ENGLAND.

MANUFACTURE OF TANKS FOR WATER OR OTHER LIQUIDS.

SPECIFICATION forming part of Letters Patent No. 647,293, dated April 10, 1900.

Application filed May 29, 1896. Serial No. 593,630. (No model.)

*To all whom it may concern:*

Be it known that I, JOHN FREDERICK CREASE, C. B., major-general in Her Britannic Majesty's army, (retired,) a subject of the Queen of Great Britain and Ireland, residing at Sion, Stourbridge, in the county of Worcester, England, have invented Improvements in the Manufacture of Tanks for Water or other Liquids, of which the following is a specification.

The object of this invention is the manufacture of metal tanks with interiors completely enameled or covered in such a manner as to effectually protect the metal from the oxidizing or corroding action of their contents. For this purpose plates of suitable metal, such as iron, are cut to suitable shapes to form the sides, top, (if any,) and bottom of the required tank. The necessary rivet-holes are formed by punching or otherwise. If the corner-joints are to be made by causing part of one plate to overlap part of another plate, the necessary portions of the plates are bent to a right or other required angle. The plates to form a tank are set up, being secured together temporarily by bolts or otherwise. All parts of each plate that are or will in the completed tank be overlapped by any other plate or angle-iron or other piece of metal are carefully marked off, also in some cases (as to the inner surface of the tank) a margin in the line of each row of rivet-holes. Then the parts are separated and all those portions of the several plates that will not be overlapped (except the margins above referred to) are enameled in any suitable way. After this enameling has been completed the parts are again assembled and secured together by riveting or electric welding. Afterward any internal parts not already coated with enamel are carefully and completely enameled or coated with a protective composition, so as to effectually protect every portion of the internal metallic surface of the tank from the action of the contents of the tank.

In order that the manner of carrying out my said invention may be clearly understood, I shall proceed to explain the same by reference to the accompanying drawings, in which—

Figure 1 is a horizontal section on the line $a\ b$ of Fig. 2, and Fig. 2 is a sectional elevation on the line $c\ d$ of Fig. 1, showing one construction of tank, the interior of which is to be completely enameled according to this invention. Figs. 3, 4, and 5 are detail views, to a larger scale than Figs. 1 and 2, illustrating joints made according to this invention. Fig. 6 is a horizontal section on the line $a'\ b'$ of Fig. 7, and Fig. 7 is a vertical section on the line $c'\ d'$ of Fig. 6, showing a modified construction of tank. Figs. 8 to 14, inclusive, are detail views showing different forms of joints.

In the example shown in Figs. 1 and 2 each side of the tank is composed of a single plate 1, each adjacent pair of which are secured together at the corners by bending the one plate so that it overlaps a part of the other, as shown at $1^a$, the bottoms of such plates being flanged inward, as shown at $1^b$, so as to overlap the edges of the bottom plate 2, which are secured to such flanges. 3 3 are angle-irons secured to the inner surface of the plates 1, near the top edge thereof, to stiffen such plates and to which the top or cover of the tank, if there be one, can be secured. The various plates, having been cut to the desired shape, bent where necessary, and formed with the necessary rivet-holes, are set up, as shown, and temporarily secured together. The parts of each of the plates where they overlap each other, as also the inner surfaces of the bent-up portions of the several plates—that is to say, the margins in which are the rows of rivet-holes— are then all carefully marked off by suitable means, such as a scriber, so that in the example shown each of the side plates 1 will have marked out thereon a central rectangular space $a\ b\ c\ d$ and the bottom plate a space $a'\ b'\ c'\ d'$, which spaces after the plates have been taken apart and the angle-irons 3 removed from the plates 1 are enameled in the ordinary way, the enamel being indicated by dotted lines at $x$ in Figs. 1 and 2. The plates are then again put together and secured by rivets, as also are the angle-irons 3 when used, after which those parts of the plates and rivet-heads not covered by enamel and also the inner surfaces of the angle-irons 3, exposed within the tank, are enameled, the requisite heat for this purpose being obtained by any suitable means—as, for example, by applying a blowpipe-flame to each side of the connected parts or by placing the tank in a heating-furnace. In the latter case the parts of the plates referred to and the rivet-heads are coated with an enameling composition that will fuse more easily and at a lower temperature than the enamel already applied to the inner surfaces of the plates, so that the latter enamel will not be injuriously affected by the second exposure to heat in a furnace. The whole of the internal metallic surface of the tank will then have been covered with a protective lining of enamel.

In some cases it may be convenient after the riveting to coat the still-unprotected parts with some protective composition other than enamel applied by the aid of heat—such, for example, as that well known in commerce as "Crease's enamel-cement paint" or other like or suitable cement or composition that will after being mixed with water, applied in a plastic state, and allowed to set form a stone-like protective covering to the surfaces to which it is applied.

In order that the enamel-cement or other like protective composition applied to the inner surfaces of the plates and angle-irons not enameled by the first enameling operation may be firmly united to such surfaces, it is advantageous to connect the various plates and angle-irons by means of rivets having heads so formed as to leave spaces between them and the adjacent surface of the plate or angle-iron, into which spaces the enamel-cement or other suitable protective composition will enter, so that when the same is set it will be firmly locked in place and will not be liable to become detached.

Fig. 3 represents a corner-joint of a tank, the side plates 1 of which are connected to an angle-iron 4 by rivets, the inner end or head 5 of each of which is flanged outward, as shown, so as to form with the said side plates annular spaces 6, that become filled with the enamel-cement or other protective composition 7, which when set cannot easily be removed.

Fig. 4 shows a modified corner-joint in which one plate overlaps the other and the two are connected by rivets of the kind shown in Fig. 3 and protected by enamel-cement or composition locked in place, as described.

Fig. 5 shows how two flat plates can be joined, as in making large tanks, by rivets of the kind described, protected as set forth. All these arrangements will be understood from the drawings without further description.

The tank shown in Figs. 6 and 7 if constructed with a cover, as shown, (which, however, may in some cases be omitted—as, for example, when an open tank or cistern is to be produced,) has its walls composed of six plates of suitable metal, such as wrought iron or steel, whereof two—viz., the top and bottom plates $2^a$ 2—are plain at the edges and are each on one face coated with enamel all over the surface, with the exception of a margin all around that is left uncoated and is to come opposite other plates or flanges, as hereinafter mentioned, two—viz., the two opposite side plates $1^a$ $1^b$—are flanged outwardly each at all the four margins thereof and have each entirely coated with enamel the reverse surface to that at which the flanges 8 are located, and two—viz., the remaining two opposite side plates $1^c$ $1^d$—are flanged each at the top and bottom thereof, as shown at 9, and are coated with enamel, each one at the reverse surface to that at which the flanges are located, but have uncoated margins $9^a$ at the unflanged sides to make joints with the flanges 8 of the plates $1^a$ $1^b$. The several plates are so put together, as shown, that they form an internally-enameled tank having all the flanges thereof projecting outwardly and every joint formed by a flanged or plain portion of one enameled plate overlapping or being face to face with and secured to a flange of another plate, these parts being fastened together in any convenient way—as, for example, by riveting or welding.

Tanks with joints wholly outside may be formed of more than five or six plates and of plates flanged otherwise than as above described. For example, each side plate may have each of its vertical margins bent to form a flange arranged at an obtuse angle to the outer surface of the plate, as shown in Fig. 8, the flange at the bottom and top of each plate being at right angles to the surface of the plate. Sometimes the projecting joints or some of them are formed by folding the edges over each other, as shown in Fig. 9, and submitting them to pressure. In some cases the outwardly-projecting joints are bent down so as to occupy less space, as shown in Fig. 10. Sometimes they are strengthened by means of angle-irons 10, as shown in Fig. 11, or by channeled or U-shaped strips $10^a$, passed over the edges to be joined, as shown in Fig. 12, the whole being suitably fastened together, as by riveting or welding or by the insertion between them of plain metal strips $10^b$, as shown in Fig. 13, or of shaped strips $10^c$, as shown in Fig. 14.

By constructing the tanks with the joints all outside, as shown in Figs. 6 to 12, inclusive, the manufacture of the tanks is facilitated, and as there are no internal overlapped or exposed parts, as in the tanks shown in Figs. 1 to 5, inclusive, except in the arrangements shown in Figs. 13 and 14, the separate coating process with enamel, enamel-cement, or other composition for protecting such overlapped parts at the inside of the back after parts of the tank have been finally fastened together may be dispensed with except in the arrangement shown in Figs. 13 and 14, when the inner edges of the strips $10^b$ and the inner surfaces and edges of the flanges $10^c$ within the tank must be protected either by enamel applied by heat or by enamel-cement or the like composition applied in the plastic state and allowed to set. It is, however, to be noted that in constructing tanks with the joints outside, as in Figs. 6 to 12, inclusive, enamel or enamel-cement or the like composition may be applied to the joints after the tank-walls have been finally put together to insure that the contents of the tank shall not have access to the metal walls.

By my invention I am enabled to produce tanks of metal, such as wrought-iron, having an internal coating of enamel alone or of enamel and enamel-cement or other suitable composition having like them a close-grained stone-like nature when set, and all of which are hereinafter included in the term "stone-like" composition.

What I claim is—

The herein-described method of manufacturing tanks with completely-enameled interiors, which consists in enameling plates that have been adapted to be overlapped and securely riveted together at their margins to form the bottom, sides and top if any, of the required tank, over those portions of their surfaces that will not be overlapped by any other plate, or piece of metal, except margins in the lines of rivet-holes, riveting the enameled plates together to form the required tank, coating those surfaces of the plates and angle-irons, if any not previously enameled and forming a part of the inner surface of the tank, also the rivet-heads, with enamel composition having a lower fusing-point than the enamel already applied to the surfaces of the plates, and heating the tank to a temperature sufficient to fuse the enamel composition last applied but not the first applied, substantially as described.

In testimony whereof I have signed my name to this specification in the presence of two subscribing witnesses.

JOHN FREDERICK CREASE.

Witnesses:
PERCY E. MATTOCKS,
EDMUND S. SNEWIN.